(12) United States Patent
Iglesias et al.

(10) Patent No.: US 11,714,540 B2
(45) Date of Patent: *Aug. 1, 2023

(54) REMOTE TOUCH DETECTION ENABLED BY PERIPHERAL DEVICE

(71) Applicant: Apple Inc., Cupertino, CA (US)

(72) Inventors: Samuel L. Iglesias, Palo Alto, CA (US); Devin W. Chalmers, Oakland, CA (US); Rohit Sethi, Mountain View, CA (US); Lejing Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,298

(22) Filed: Sep. 22, 2020

(65) Prior Publication Data

US 2021/0004133 A1 Jan. 7, 2021

Related U.S. Application Data

(63) Continuation of application No. 16/554,432, filed on Aug. 28, 2019, now Pat. No. 10,809,910.

(Continued)

(51) Int. Cl.
*G06F 3/0488* (2013.01)
*G06F 3/044* (2006.01)
(Continued)

(52) U.S. Cl.
CPC ............ *G06F 3/0488* (2013.01); *G06F 3/044* (2013.01); *G06F 3/0426* (2013.01); *G06F 3/04845* (2013.01)

(58) Field of Classification Search
CPC .. G06F 3/017; G06F 3/03547; G06F 3/04842; G06F 1/163; G06F 3/0488; G06F 3/0426; G06F 3/04845; G06F 3/044
See application file for complete search history.

(56) References Cited

U.S. PATENT DOCUMENTS

| 11,045,725 | B1 | 6/2021 | Sawyer et al. |
| 2010/0141770 | A1 | 6/2010 | Gomi |

(Continued)

FOREIGN PATENT DOCUMENTS

| CN | 104620212 A | 5/2015 |
| CN | 105377117 A | 3/2016 |

(Continued)

OTHER PUBLICATIONS

Changbo Wang et al., 3D Multi-touch Recognition Based Virtual Interaction, Oct. 1, 2010, IEEE Xplore, pp. 1478-1481 (Year: 2010).*

(Continued)

*Primary Examiner* — Tam T Tran
(74) *Attorney, Agent, or Firm* — DLA Piper LLP (US)

(57) ABSTRACT

The present disclosure relates generally to remote touch detection. In some examples, a first electronic device obtains first image data and second image data about an input, and performs an operation based on the input in accordance with a determination that a set of one or more criteria is met based on the first image data and the second image data. In some examples, a first electronic device causes emission of infrared light by an infrared source of a second electronic device, obtains image data about an input, and performs an operation based on the input in accordance with a determination that a set of one or more criteria is met based on the image data.

25 Claims, 15 Drawing Sheets

Related U.S. Application Data

(60) Provisional application No. 62/738,435, filed on Sep. 28, 2018.

(51) Int. Cl.
*G06F 3/04845* (2022.01)
*G06F 3/042* (2006.01)

(56) References Cited

U.S. PATENT DOCUMENTS

| | | | |
|---|---|---|---|
| 2010/0177035 | A1 | 7/2010 | Schowengerdt et al. |
| 2011/0063224 | A1 | 3/2011 | Vexo et al. |
| 2011/0130159 | A1 | 6/2011 | Chen et al. |
| 2012/0038667 | A1 | 2/2012 | Branson et al. |
| 2013/0194188 | A1 | 8/2013 | Walker et al. |
| 2014/0191977 | A1 | 7/2014 | Feng et al. |
| 2014/0293079 | A1* | 10/2014 | Milanfar ............... H04N 23/811 348/222.1 |
| 2014/0362110 | A1 | 12/2014 | Stafford |
| 2015/0227222 | A1 | 8/2015 | Sako et al. |
| 2015/0242414 | A1* | 8/2015 | Starner ................... G06F 1/163 715/719 |
| 2015/0258431 | A1 | 9/2015 | Stafford et al. |
| 2016/0117860 | A1 | 4/2016 | Fei et al. |
| 2016/0231862 | A1 | 8/2016 | Tretter et al. |
| 2017/0076502 | A1 | 3/2017 | Chen et al. |
| 2017/0262045 | A1 | 9/2017 | Rouvinez et al. |
| 2017/0300116 | A1 | 10/2017 | Lyons et al. |
| 2017/0308258 | A1 | 10/2017 | Xu et al. |
| 2018/0004312 | A1 | 1/2018 | Lee et al. |
| 2018/0136721 | A1 | 5/2018 | Alleaume et al. |
| 2018/0261067 | A1* | 9/2018 | Bostick .............. G08B 21/0476 |
| 2018/0364853 | A1 | 12/2018 | Pahud et al. |
| 2019/0019032 | A1* | 1/2019 | Bostick .................. G06V 20/20 |
| 2019/0050132 | A1 | 2/2019 | Rawlings et al. |
| 2019/0141181 | A1* | 5/2019 | Wantland .............. G06F 1/3231 |
| 2019/0369714 | A1 | 12/2019 | Pla I. Conesa et al. |
| 2020/0104025 | A1 | 4/2020 | Iglesias et al. |

FOREIGN PATENT DOCUMENTS

| | | |
|---|---|---|
| CN | 106062862 A | 10/2016 |
| CN | 108073280 A | 5/2018 |
| EP | 3264229 A1 | 1/2018 |
| JP | 2010-136223 A | 6/2010 |
| KR | 10-2017-0130602 A | 11/2017 |
| KR | 10-2018-0002208 A | 1/2018 |
| KR | 10-2018-0025402 A | 3/2018 |
| WO | 2017/048519 A1 | 3/2017 |
| WO | 2018/090060 A1 | 5/2018 |

OTHER PUBLICATIONS

Alvin Chan et. al., Real-time Tracking of Hand Gestures for Interactive Game Design, Jul. 1, 2009, IEEE International Symposium on Industrial Electronics, pp. 98-103 (Year: 2009).*

Ming He et al., Touch-Sensitive Interactive Projection System, Oct. 1, 2014, IEEE Xplore International Conference on SPAC, pp. 436-441 (Year: 2014).*

Felipe Gil-Castineira et al., Remote Virtual Peripheral Framework: Enabling Dynamically Composed Devices, Jan. 1, 2011, IEEE Xplore, pp. 405-409 (Year: 2011).*

Xingjuan Li et al., Hand Manipulated Cubic Display for Virtual Environments, Sep. 1, 2011, IEEE Xplore, pp. 322-325 (Year: 2011).*

Hartmut Seichter et al., Multitouch Interaction for Tangible User Interfaces, Oct. 1, 2009, IEEE Xplore, pp. 213-214 (Year: 2009).*

International Search Report and Written Opinion received for PCT Patent Application No. PCT/US2019/033253, dated Aug. 9, 2019, 16 pages.

Non-Final Office Action received for U.S. Appl. No. 16/410,547, dated Jun. 29, 2020, 34 pages.

Notice of Allowance received for U.S. Appl. No. 16/554,432, dated Jul. 1, 2020, 9 pages.

Berman et al., "Sensors for Gesture Recognition Systems", IEEE Transactions on Systems, Man, and Cybernetics, Part C, Applications and Reviews, vol. 42, No. 3, May 2012, pp. 277-290.

Chakraborty et al., "Interactive Touch Screen using Augmented Reality", 4th International Conference on Applied and Theoretical Computing and Communication Technology, 2018, pp. 294-298.

International Preliminary Report on Patentability received for PCT Patent Application No. PCT/US2019/033253, dated Dec. 17, 2020, 12 pages.

Final Office Action received for U.S. Appl. No. 16/410,547, dated Feb. 18, 2021, 39 pages.

Advisory Action received for U.S. Appl. No. 16/410,547, dated May 24, 2021, 5 pages.

Applicant-Initiated Interview Summary received for U.S. Appl. No. 16/410,547, dated Dec. 13, 2021, 3 pages.

Supplemental Notice of Allowance received for U.S. Appl. No. 16/410,547, dated Apr. 14, 2022, 3 pages.

Non-Final Office Action received for U.S. Appl. No. 16/410,547, dated Jul. 22, 2021, 47 pages.

Office Action received for Chinese Patent Application No. 201910815262.6, dated Aug. 27, 2021, 10 pages (5 pages of English Translation and 5 pages of Official Copy).

Decision to Grant received for Japanese Patent Application No. 2020-565377, dated Jan. 26, 2022, 3 pages (1 page of English Translation and 2 pages of Official Copy).

Notice of Allowance received for Chinese Patent Application No. 201910815262.6, dated Jan. 14, 2022, 2 pages (1 page of English Translation and 1 page of Official Copy).

Office Action received for Korean Patent Application No. 10-2020-7033785, dated Jan. 10, 2022, 12 pages (06 pages of English Translation and 06 pages of Official Copy).

Notice of Allowance received for U.S. Appl. No. 16/410,547, dated Mar. 31, 2022, 11 pages.

Supplemental Notice of Allowance received for U.S. Appl. No. 16/410,547, dated Sep. 12, 2022, 3 pages.

Supplemental Notice of Allowance received for U.S. Appl. No. 16/410,547, dated Sep. 22, 2022, 3 pages.

Notice of Allowance received for Korean Patent Application No. 10-2020-7033785, dated Jul. 21, 2022, 5 pages (2 pages of English Translation and 3 pages of Official Copy).

Notice of Allowance received for U.S. Appl. No. 16/410,547, dated Jul. 15, 2022, 11 pages.

Office Action received for European Patent Application No. 19728844. 2, dated Jun. 21, 2022, 8 pages.

* cited by examiner

REMOTE TOUCH DETECTION ENABLED BY PERIPHERAL DEVICE

CROSS-REFERENCE TO RELATED APPLICATIONS

This application is a continuation of U.S. patent application Ser. No. 16/554,432, entitled "REMOTE TOUCH DETECTION ENABLED BY PERIPHERAL DEVICE," filed Aug. 28, 2019, which claims the benefit of U.S. Provisional Application No. 62/738,435, entitled "REMOTE TOUCH DETECTION ENABLED BY PERIPHERAL DEVICE," filed Sep. 28, 2018, the contents of which are hereby incorporated by reference in their entireties.

TECHNICAL FIELD

The present disclosure relates generally to computer-generated reality (CGR) environments, and more specifically to techniques for remote touch detection.

BACKGROUND

CGR environments are environments where some objects displayed for a user's viewing are generated by a computer. A user can interact with these virtual objects by activating hardware buttons or touching touch-enabled hardware. However, such techniques for interacting with virtual objects can be cumbersome and non-intuitive for a user.

SUMMARY

Described herein are techniques for remote touch detection using a system of multiple devices, including a peripheral device that is placed on a physical surface such as the top of a table. With these techniques, a user can interact with virtual objects by performing touches on a physical surface.

In some embodiments, a method is described. The method comprises: at a first electronic device: obtaining first image data about an input, wherein the first image data is obtained using one or more camera sensors of a first electronic device external to a second electronic device; obtaining second image data about the input, wherein the second image data is obtained using one or more camera sensors of the second electronic device, the first electronic device different from the second electronic device; and in accordance with a determination that a set of one or more criteria is met based on the first image data and the second image data, performing an operation based on the input, wherein the set of one or more criteria includes a criterion that is met when the input is a touch input.

In some embodiments, a non-transitory computer-readable storage medium is described. The non-transitory computer-readable storage medium stores one or more programs configured to be executed by one or more processors of a first electronic device, the one or more programs including instructions for: obtaining first image data about an input, wherein the first image data is obtained using one or more camera sensors of the first electronic device external to a second electronic device; obtaining second image data about the input, wherein the second image data is obtained using one or more camera sensors of the second electronic device, the second electronic device different from the first electronic device; and in accordance with a determination that a set of one or more criteria is met based on the first image data and the second image data, performing an operation based on the input, wherein the set of one or more criteria includes a criterion that is met when the input is a touch input.

In some embodiments, a transitory computer-readable storage medium is described. The transitory computer-readable storage medium stores one or more programs configured to be executed by one or more processors of a first electronic device, the one or more programs including instructions for: obtaining first image data about an input, wherein the first image data is obtained using one or more camera sensors of the first electronic device external to a second electronic device; obtaining second image data about the input, wherein the second image data is obtained using one or more camera sensors of the second electronic device, the second electronic device different from the first electronic device; and in accordance with a determination that a set of one or more criteria is met based on the first image data and the second image data, performing an operation based on the input, wherein the set of one or more criteria includes a criterion that is met when the input is a touch input.

In some embodiments, a first electronic device is described. The first electronic device comprises: one or more processors; and memory storing one or more programs configured to be executed by the one or more processors, the one or more programs including instructions for: obtaining first image data about an input, wherein the first image data is obtained using one or more camera sensors of the first electronic device external to a second electronic device; obtaining second image data about the input, wherein the second image data is obtained using one or more camera sensors of the second electronic device, the second electronic device different from the first electronic device; and in accordance with a determination that a set of one or more criteria is met based on the first image data and the second image data, performing an operation based on the input, wherein the set of one or more criteria includes a criterion that is met when the input is a touch input.

In some embodiments, a first electronic device is described. The first electronic device comprises: means for obtaining first image data about an input, wherein the first image data is obtained using one or more camera sensors of the first electronic device external to a second electronic device; means for obtaining second image data about the input, wherein the second image data is obtained using one or more camera sensors of the second electronic device, the second electronic device different from the first electronic device; and means, in accordance with a determination that a set of one or more criteria is met based on the first image data and the second image data, for performing an operation based on the input, wherein the set of one or more criteria includes a criterion that is met when the input is a touch input.

In some embodiments, a method is described. The method comprises: at a first electronic device: causing emission of infrared light by an infrared source of a second electronic device; obtaining image data about an input, wherein the image data is obtained using one or more camera sensors of a first electronic device, the second electronic device different from the first electronic device; and in accordance with a determination that a set of one or more criteria is met based on the image data, performing an operation based on the input, wherein the set of one or more criteria includes a criterion that is met when the input contacts the infrared light.

In some embodiments, a non-transitory computer-readable storage medium is described. The non-transitory computer-readable storage medium stores one or more programs configured to be executed by one or more processors of a first electronic device, the one or more programs including instructions for: causing emission of infrared light by an infrared source of a second electronic device; obtaining image data about an input, wherein the image data is obtained using one or more camera sensors of the first electronic device, the second electronic device different from the first electronic device; and in accordance with a determination that a set of one or more criteria is met based on the image data, performing an operation based on the input, wherein the set of one or more criteria includes a criterion that is met when the input contacts the infrared light.

In some embodiments, a transitory computer-readable storage medium is described. The transitory computer-readable storage medium stores one or more programs configured to be executed by one or more processors of a first electronic device, the one or more programs including instructions for: causing emission of infrared light by an infrared source of a second electronic device; obtaining image data about an input, wherein the image data is obtained using one or more camera sensors of the first electronic device, the second electronic device different from the first electronic device; and in accordance with a determination that a set of one or more criteria is met based on the image data, performing an operation based on the input, wherein the set of one or more criteria includes a criterion that is met when the input contacts the infrared light.

In some embodiments, a first electronic device is described. The first electronic device comprises: one or more processors; and memory storing one or more programs configured to be executed by the one or more processors, the one or more programs including instructions for: causing emission of infrared light by an infrared source of a second electronic device; obtaining image data about an input, wherein the image data is obtained using one or more camera sensors of the first electronic device, the second electronic device different from the first electronic device; and in accordance with a determination that a set of one or more criteria is met based on the image data, performing an operation based on the input, wherein the set of one or more criteria includes a criterion that is met when the input contacts the infrared light.

In some embodiments, a first electronic device is described. The first electronic device comprises: means for causing emission of infrared light by an infrared source of a second electronic device; means for obtaining image data about an input, wherein the image data is obtained using one or more camera sensors of the first electronic device, the second electronic device different from the first electronic device; and means, in accordance with a determination that a set of one or more criteria is met based on the image data, for performing an operation based on the input, wherein the set of one or more criteria includes a criterion that is met when the input contacts the infrared light.

In some embodiments, a method is described. The method comprises: at a first electronic device: causing emission of infrared light by an infrared source of the first electronic device; obtaining image data about an input, wherein the image data is obtained using one or more camera sensors of a second electronic device, the first electronic device different from the second electronic device; and in accordance with a determination that a set of one or more criteria is met based on the image data, performing an operation based on the input, wherein the set of one or more criteria includes a criterion that is met when the input contacts the infrared light.

In some embodiments, a non-transitory computer-readable storage medium is described. The non-transitory computer-readable storage medium stores one or more programs configured to be executed by one or more processors of a first electronic device, the one or more programs including instructions for: causing emission of infrared light by an infrared source of the first electronic device; obtaining image data about an input, wherein the image data is obtained using one or more camera sensors of a second electronic device, the first electronic device different from the second electronic device; and in accordance with a determination that a set of one or more criteria is met based on the image data, performing an operation based on the input, wherein the set of one or more criteria includes a criterion that is met when the input contacts the infrared light.

In some embodiments, a transitory computer-readable storage medium is described. The transitory computer-readable storage medium stores one or more programs configured to be executed by one or more processors of a first electronic device, the one or more programs including instructions for: causing emission of infrared light by an infrared source of the first electronic device; obtaining image data about an input, wherein the image data is obtained using one or more camera sensors of a second electronic device, the first electronic device different from the second electronic device; and in accordance with a determination that a set of one or more criteria is met based on the image data, performing an operation based on the input, wherein the set of one or more criteria includes a criterion that is met when the input contacts the infrared light.

In some embodiments, a first electronic device is described. The first electronic device comprises: one or more processors; and memory storing one or more programs configured to be executed by the one or more processors, the one or more programs including instructions for: causing emission of infrared light by an infrared source of the first electronic device; obtaining image data about an input, wherein the image data is obtained using one or more camera sensors of a second electronic device, the first electronic device different from the second electronic device; and in accordance with a determination that a set of one or more criteria is met based on the image data, performing an operation based on the input, wherein the set of one or more criteria includes a criterion that is met when the input contacts the infrared light.

In some embodiments, a first electronic device is described. The first electronic device comprises: means for causing emission of infrared light by an infrared source of the first electronic device; means for obtaining image data about an input, wherein the image data is obtained using one or more camera sensors of a second electronic device, the first electronic device different from the second electronic device; and means, in accordance with a determination that a set of one or more criteria is met based on the image data, for performing an operation based on the input, wherein the set of one or more criteria includes a criterion that is met when the input contacts the infrared light.

BRIEF DESCRIPTION OF THE FIGURES

In the following description, reference is made to the accompanying figures which form a part thereof, and which illustrate several examples of the present disclosure. It is understood that other examples may be utilized and structural and operational changes may be made without departing from the scope of the present disclosure. The use of the same reference symbols in different figures indicates similar or identical items.

DETAILED DESCRIPTION

Figure 1A:
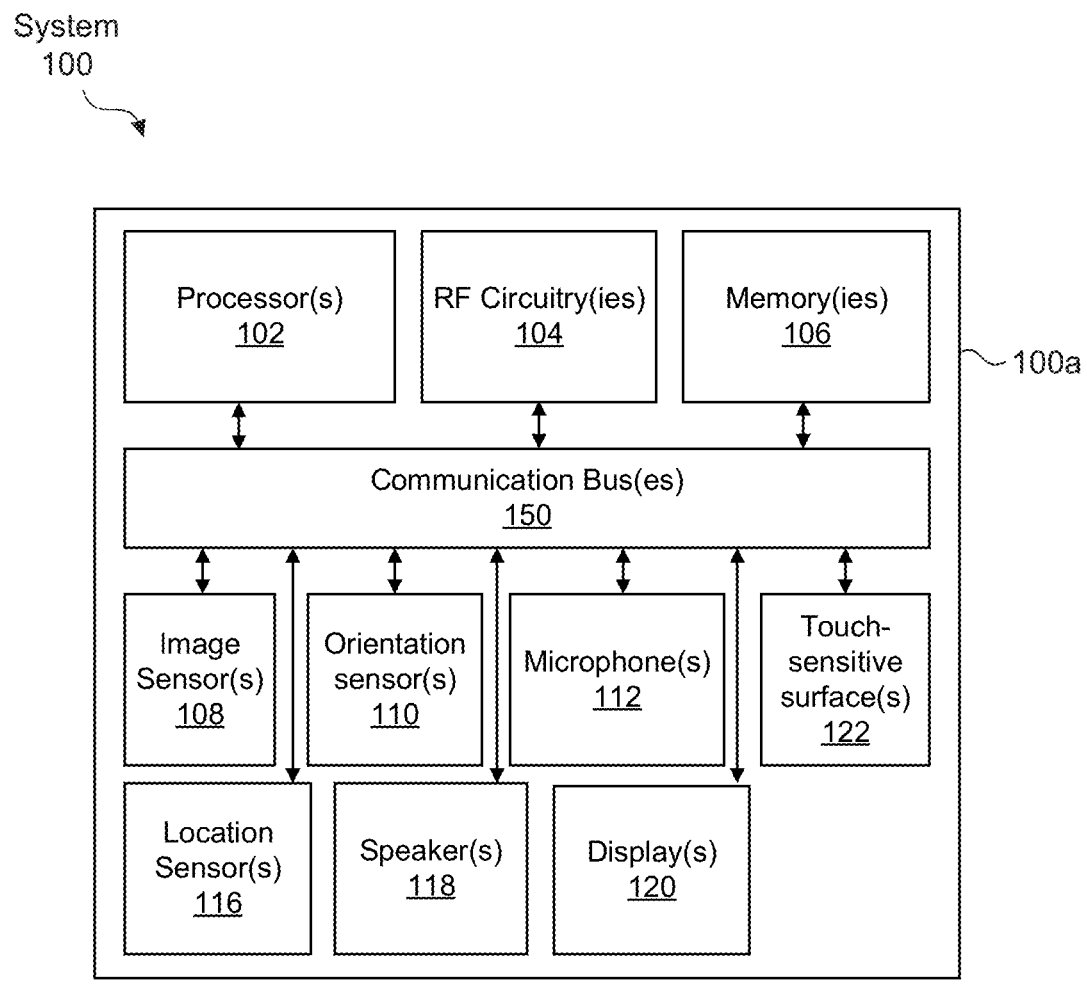
FIGS. 1A-1B depict exemplary systems for use in various CGR technologies.
Figure 1B:
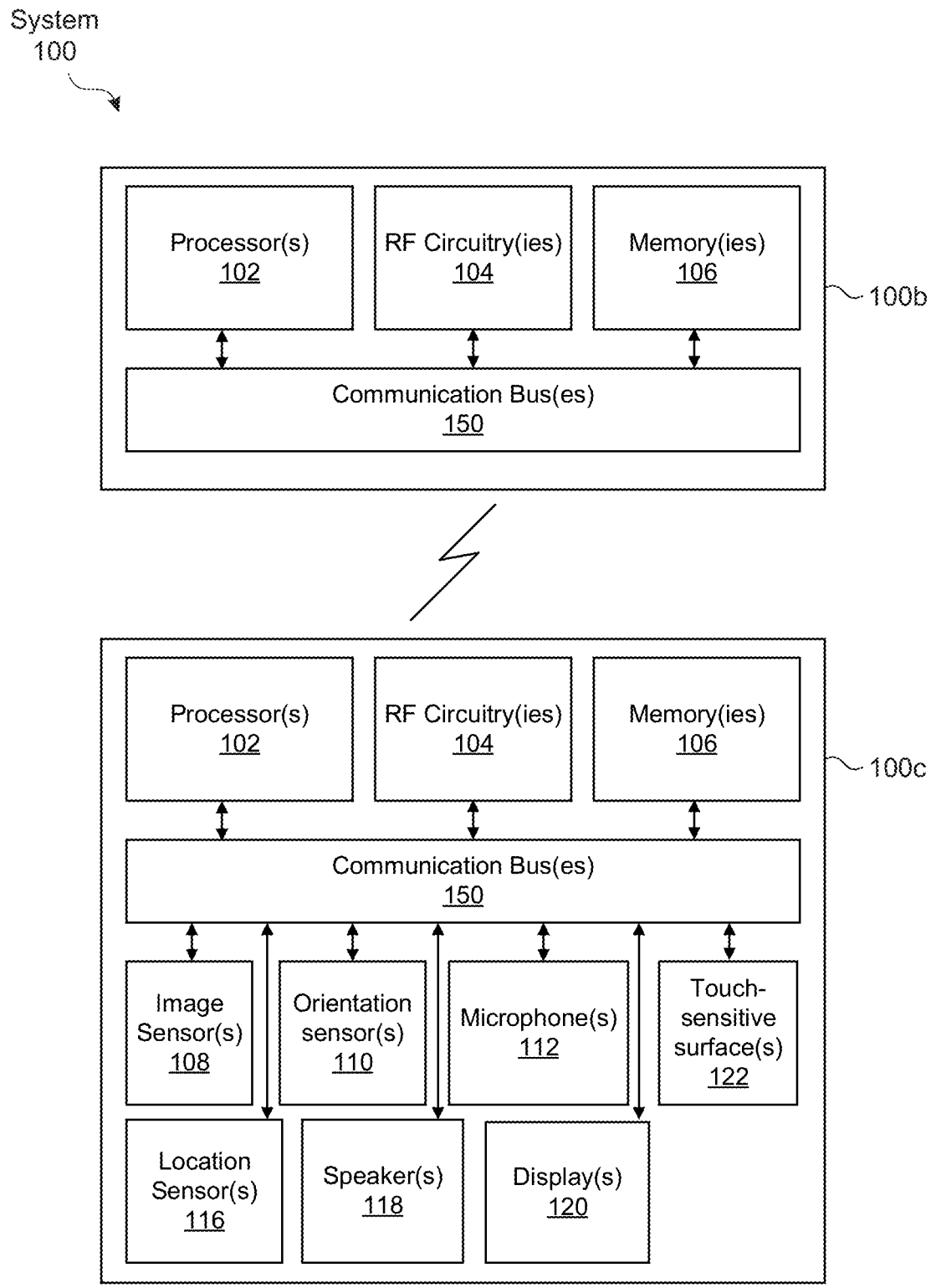

FIG. 1A and FIG. 1B depict exemplary system 100 for use in various CGR technologies.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some embodiments, device 100a is implemented in a base station device or an HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some embodiments, system 100 is a mobile device. In some embodiments, system 100 is an HMD device. In some embodiments, system 100 is a wearable HUD device.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some embodiments, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some embodiments, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some embodiments, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the physical environment. Image sensor(s) also optionally include one or more infrared (IR) sensor(s), such as a passive IR sensor or an active IR sensor, for detecting infrared light from the physical environment. For example, an active IR sensor includes an IR emitter, such as an IR dot emitter, for emitting infrared light into the physical environment. Image sensor(s) 108 also optionally include one or more event camera(s) configured to capture movement of physical objects in the physical environment. Image sensor(s) 108 also optionally include one or more depth sensor(s) configured to detect the distance of physical objects from system 100. In some embodiments, system 100 uses CCD sensors, event cameras, and depthسensors in combination to detect the physical environment around system 100. In some embodiments, image sensor(s) 108 include a first image sensor and a second image sensor. The first image sensor and the second image sensor are optionally configured to capture images of physical objects in the physical environment from two distinct perspectives. In some embodiments, system 100 uses image sensor(s) 108 to receive user inputs, such as hand gestures. In some embodiments, system 100 uses image sensor(s) 108 to detect the position and orientation of system 100 and/or display(s) 120 in the physical environment. For example, system 100 uses image sensor(s) 108 to track the position and orientation of display(s) 120 relative to one or more fixed objects in the physical environment. In some embodiments, system 100 uses image sensor(s) 108 that are inward facing (e.g., facing the user) for gaze tracking and/or hand motion tracking, which can be used, for example, to control a user's avatar.

In some embodiments, system 100 includes microphones(s) 112. System 100 uses microphone(s) 112 to detect sound from the user and/or the physical environment of the user. In some embodiments, microphone(s) 112 includes an array of microphones (including a plurality of microphones) that optionally operate in tandem, such as to identify ambient noise or to locate the source of sound in space of the physical environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the physical environment. Orientation sensor(s) 110 optionally include one or more gyroscopes and/or one or more accelerometers.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
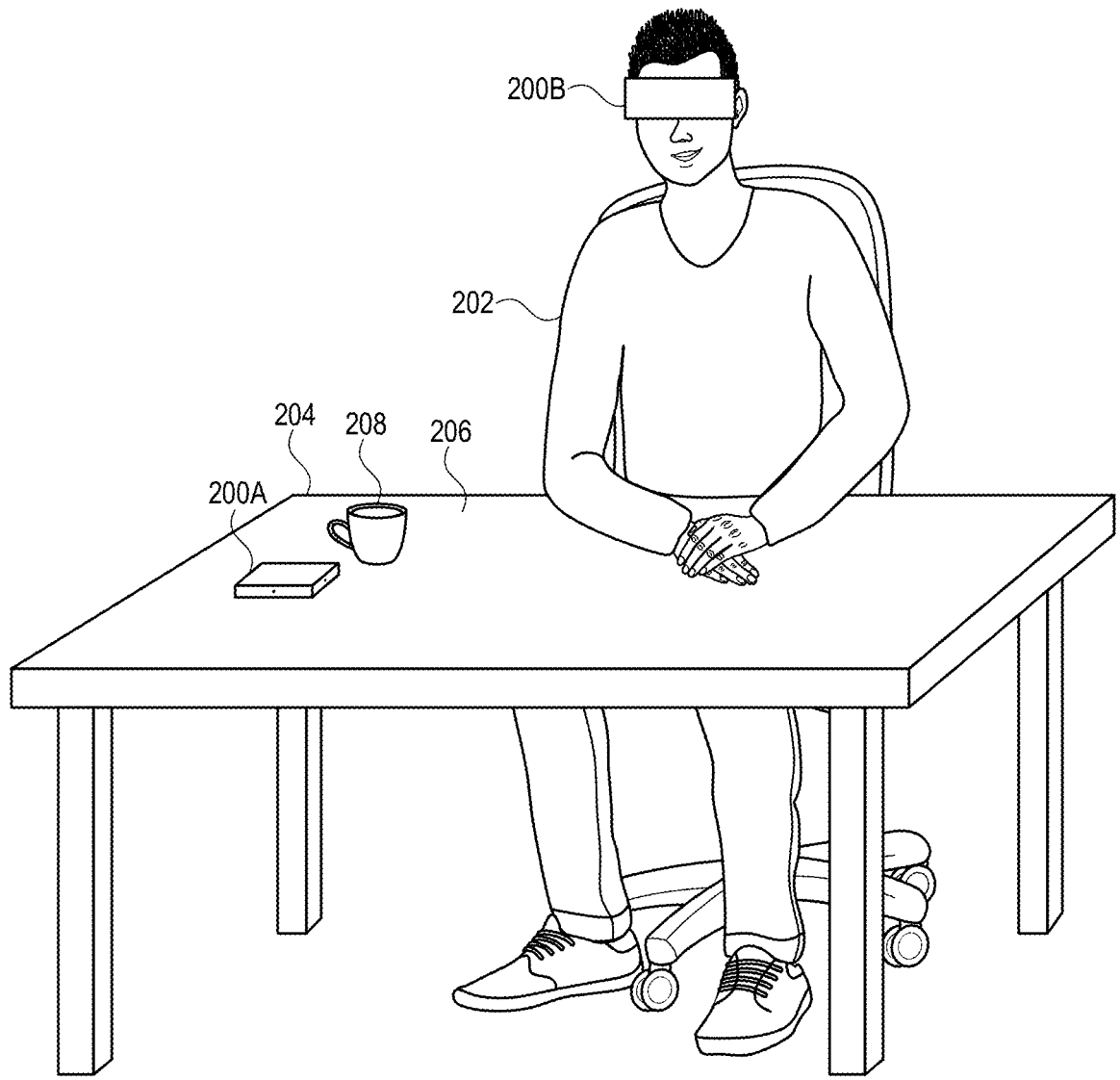
FIG. 2 illustrates an example of a system comprising a head-mounted display device and a peripheral device for enabling remote touch detection.

FIG. 2 illustrates system 200, including peripheral device 200A and head-mounted display (HMD) device 200B. Peripheral device includes camera sensor(s) 210 (e.g., image sensor(s) 108) and motion sensor(s) (e.g., orientation sensor(s) 110). Additionally, HMD device 200B can itself be an embodiment of system 100, or can be an embodiment of a portion of system 100 such as device 100a.

System 200, including peripheral device 200A and HMD device 200B, enables accurate remote touch detection on surface 206 in order to interact with (e.g., control, manipulate, activate, select) displayed UI elements in a CGR environment displayed using HMD device 200B. In some embodiments, system 200 forms a three angle system (e.g., one camera sensors on peripheral device 200A and two camera sensors on HMD device 200B). In some embodiments, system 200 includes peripheral device 200A (e.g., with no camera sensors) that emits infrared light to be detected by camera sensor(s) on HMD device 200B. In some embodiments, system 200 excludes peripheral device 200A and relies on HMD device 200B to perform remote touch detection using depth sensing technologies.

At FIG. 2, user 202 is wearing HMD device 200B, which enables the user to view a CGR environment. User 202 is seated at table 204 in a physical environment, where table 204 includes surface 206 on which physical objects, such as peripheral device 200A and object 208 (e.g., a physical cup), are placed.

Figure 3:
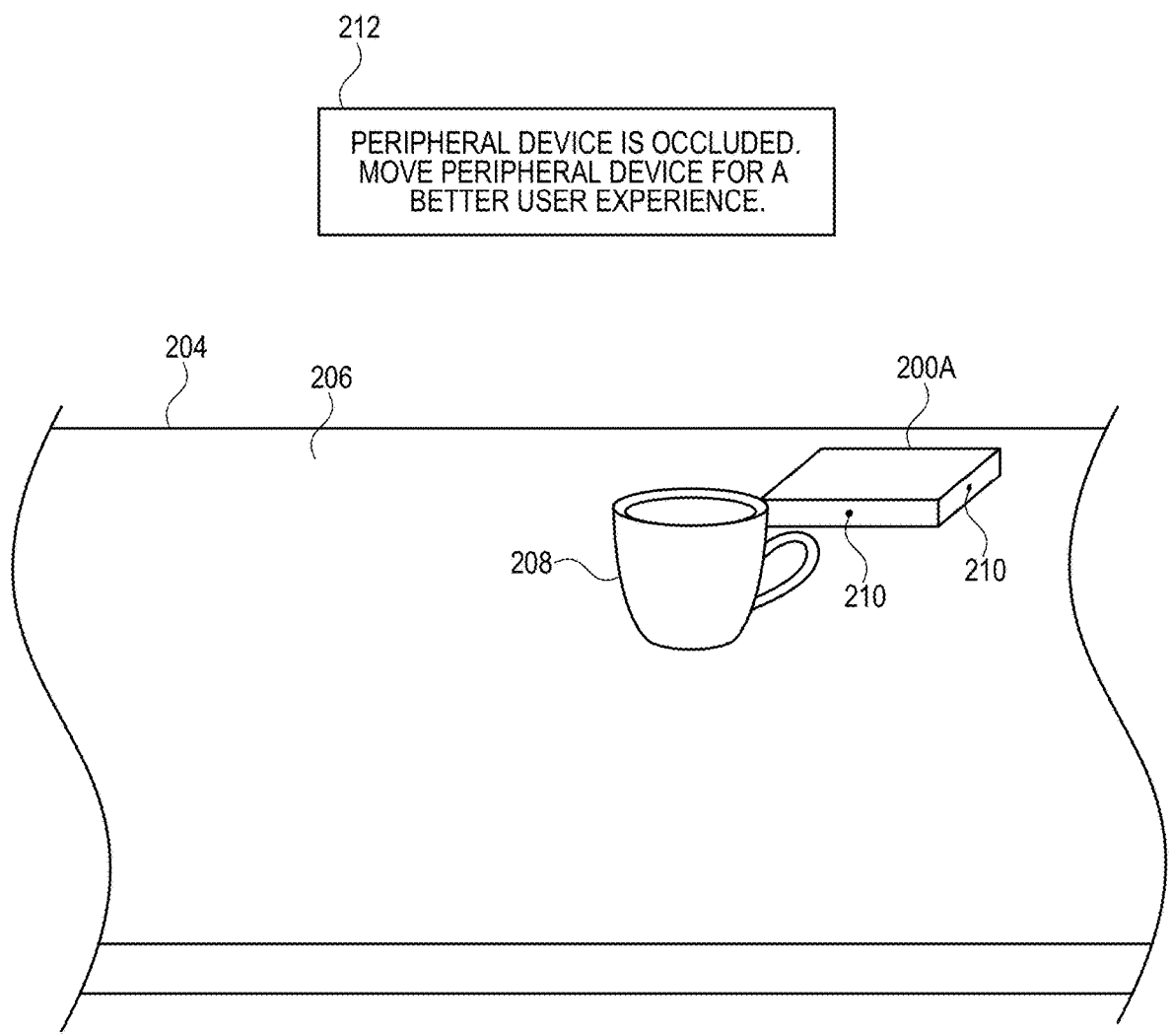
FIG. 3 illustrates an example of a notification that prompts the user to correct an error condition.

FIG. 3 illustrates the perspective from which user 202 is viewing CGR environment via a transparent or translucent display of HMD device 200B. In some embodiments, the display of HMD device 200B is opaque, so the user views the physical environment using pass-through video.

At FIG. 3, peripheral device 200A is located on surface 206 adjacent to object 208. For optimal operation, peripheral device 200A can request additional space near or around itself such that camera sensor(s) 210 are free from occlusions (e.g., obstructions). In FIG. 3, system 200 determines whether a set of one or more operating conditions has been met. In some embodiments, the set of operating conditions includes a requirement that a direct line of sight exists between sensors on peripheral device 200A (e.g., camera sensor(s) 210) and sensor(s) on HMD device 200B. In some embodiments, the set of operating conditions includes a requirement that no object occludes (e.g., obstructs) camera sensor(s) 210. For example, no object occludes camera sensor(s) 210 when no object is within a predefined threshold distance of the camera sensor(s). Due to the close proximity of object 208 to camera sensor(s) 210, system 200 determines that camera sensor(s) 210 are occluded. Peripheral device 200A, HMD device 200B, or a third device can determine whether camera sensor(s) 210 are occluded. In some embodiments, the set of operating conditions includes a requirement that peripheral device 200A is in a suitable orientation (e.g., a surface of the peripheral device is approximately parallel with respect to the ground, is horizontal, is vertical, so forth).

In some embodiments, determining whether camera sensor(s) 210 are occluded includes obtaining image data about objects near or adjacent to camera sensor(s) 210, and determining, based on the image data, whether camera sensor(s) 210 are occluded. In some embodiments, HMD device 200B determines whether camera sensor(s) 210 are occluded. In some embodiments, determining, by HMD device 200B, whether camera sensor(s) 210 are occluded includes receiving, from peripheral device 200A, image data about objects in the field of view of camera sensor(s) 210. In some embodiments, after (or in response to) receiving image data from peripheral device 200A, HMD device 200B determines, based on image data, whether camera sensor(s) 210 are occluded. In some embodiments, the image data includes image data generated using camera sensor(s) 210 and/or camera sensor(s) at HMD device 200B.

Upon a determination that camera sensor(s) 210 are occluded, HMD device 200B displays notification 212, which prompts the user to correct an error condition. Notification 212 includes an indication that peripheral device 200A is occluded. Notification 212 also includes a prompt to move peripheral device 200A to a new location. In some embodiments, notification 212 includes a prompt to move the object that is causing camera sensor(s) 210 to be occluded.

Figure 4:
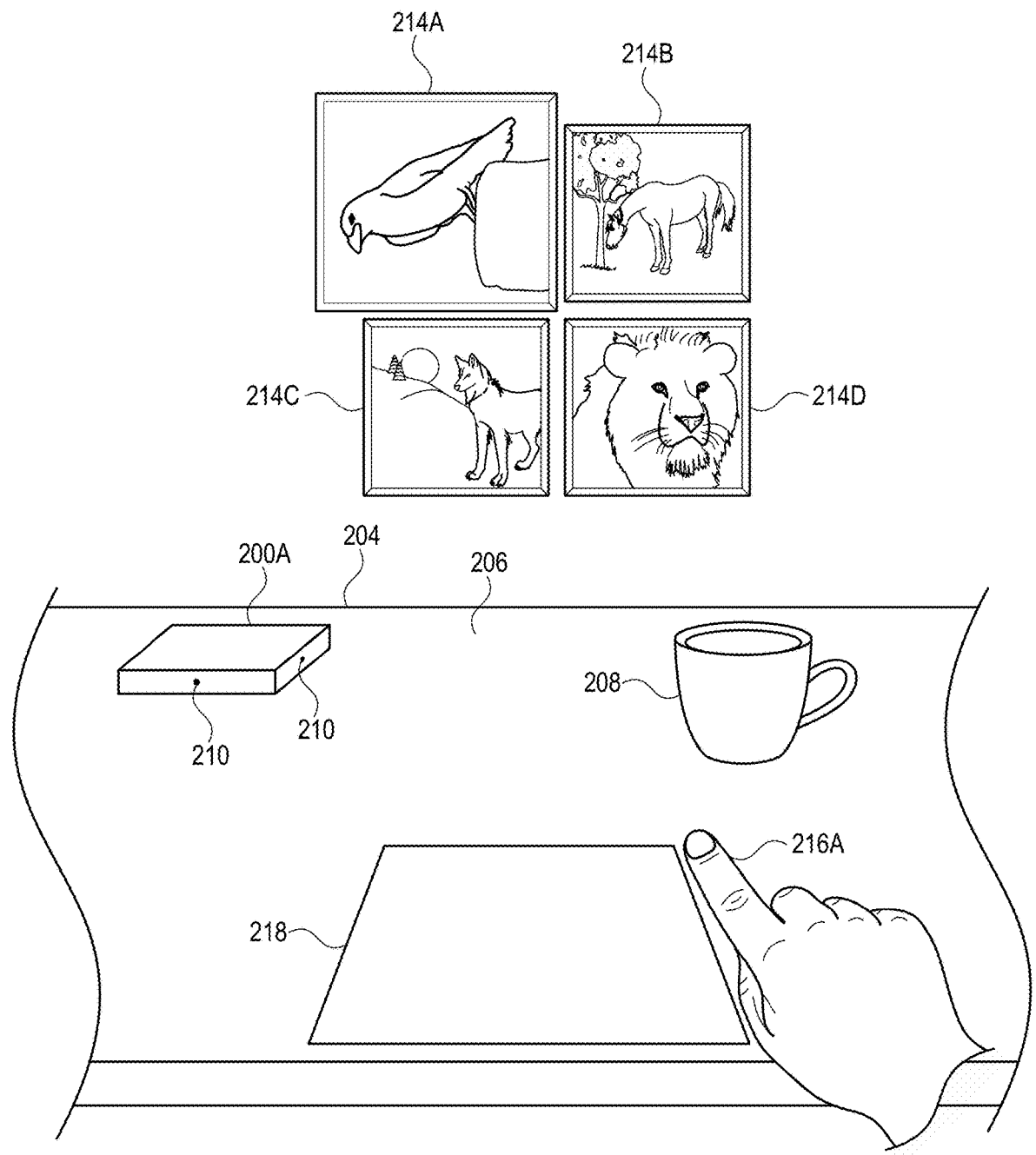
FIGS. 4-5 illustrate an example of remote touch detection in a CGR environment.

At FIG. 4, user 202 views the CGR environment after peripheral device 200A has been moved to a new location. After (or in response to) peripheral device 200A being moved to a new location, system 200 determines whether camera sensor(s) 210 are occluded. System 200 determines that camera sensor(s) are not occluded. For example, system 200 determines that object 208 is located outside a threshold distance away from camera sensor(s) 210. In some embodiments, system 200 determines whether camera sensor(s) 210 are occluded in response to determining that peripheral device 200A has been moved to a new location. Peripheral device 200A, HMD device 200B, or a third device can determine whether peripheral device 200A has been moved to a new location. In some embodiments, data obtained from motion sensor(s) of peripheral device 200A are used to make this determination. Upon a determination that the set of operating conditions are met for peripheral device 210A (e.g., camera sensor(s) 210 are no longer occluded), HMD device 200B ceases displaying notification 212.

At FIG. 4, subsequent to (or in response to) the set of operating conditions being met for peripheral device 210A, HMD device 200B displays a user interface (UI). In FIG. 4, the user interface includes UI elements 214A, 214B, 214C, and 214D. Additionally, HMD device 200B displays virtual trackpad 218, which is displayed in a manner such that virtual trackpad 218 appears to be placed on (or coinciding with) surface 206. In some embodiments, HMD device 200B does not display virtual trackpad 218. In some embodiments, HMD device 200B displays a virtual keyboard in addition to or in place of virtual trackpad 218. In some embodiments, system 200 receives input via the virtual keyboard when a user performs a tap gesture at a location of (or corresponding to) a key of the displayed virtual keyboard.

Once the UI elements are displayed, suppose the user notices that UI element 214A is in the wrong orientation, and thus wishes to correct its orientation. The user begins by preparing to perform a tap gesture on surface 206. Peripheral device 200A obtains information about object 216A (e.g., an index finger of a user's hand) using camera sensor(s) 210. Additionally, HMD device 200B obtains information about object 216A via the camera sensors located at HMD device 200B. Accordingly, both peripheral device 200A and HMD device 200B use their respective camera sensors to obtain information (e.g., image data) about object 216A. Obtaining information about objects can include using a camera sensor to capture one or more images of the object in the field of view of the camera sensor. Capturing information about object 216A from the perspectives of both devices 200A and 200B allows the devices to better resolve the position and movement of object 216A thereby facilitating detection accuracy.

Figure 5:
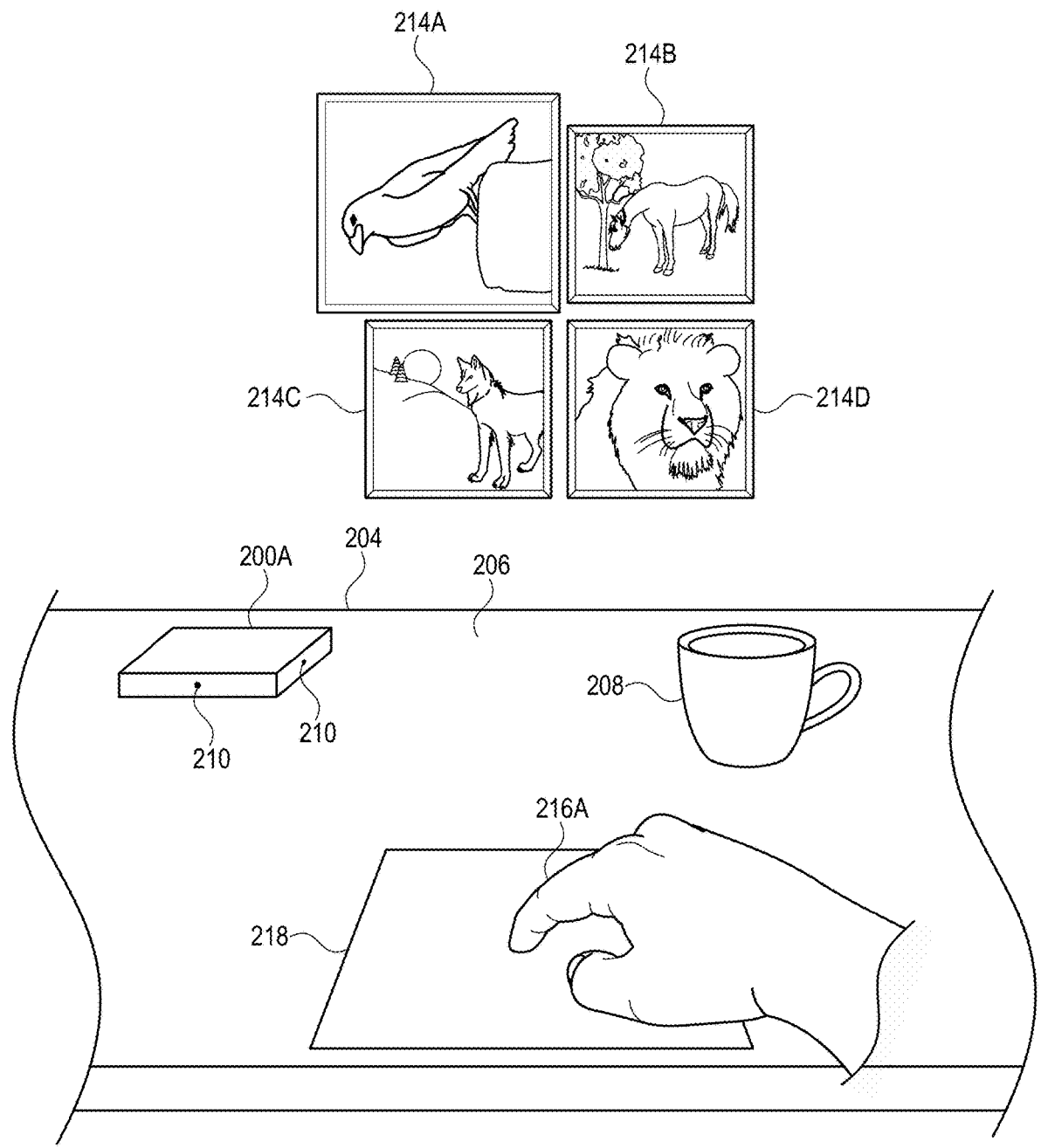

At FIG. 5, while UI element 214A is highlighted for selection (e.g., emphasized with respect to the other UI elements), the user selects UI element 214A for editing by performing a tap gesture on surface 206 with object 216A. As object 216A moves towards surface 206, peripheral device 200A and/or HMD device 200B capture information about object 216A using the camera sensors of the respective devices. System 200 uses this information to determine whether the movement of object 216A satisfies a set of one or more criteria, including, for example, a requirement that the movement of the object results in a touch input. Peripheral device 200A, HMD device 200B, or a third device can make this determination. In some embodiments, determining whether the movement of object 216A satisfies a set of one or more criteria includes determining whether the movement of object 216A is a valid input (e.g., a valid input to system 200). In some embodiments, the set of one or more criteria includes a requirement that the touch input occur within the boundaries of virtual trackpad 218. In some embodiments, system 200 uses the captured images to track objects (e.g., object 216A) using 3D object detection and/or template matching. In some embodiments, system 200 extracts hand pose information and/or finger pose information from the captured images to determine whether the movement of object 216A satisfies the set of one or more criteria.

In some embodiments, the movement of the object results in a touch input when the information obtained by the camera sensors indicates that the object has touched (e.g., coincided with) the surface. In some embodiments, the set of one or more criteria includes whether the movement of the object is a recognized gesture. Notably, device 200B may be better able to detect taps on the surface as it is also located on the surface and therefore sensors 210 may have a clear line of sight to the location of the tap. In contrast, device 200A may resort to depth analysis to determine if the object has moved in such a way along the z-axis to qualify as a tap on the surface. In some embodiments, the set of one or more criteria includes a requirement that the object is a valid object. For example, an object is a valid object when the object is a digit of a hand. In some embodiments, an object is a valid object when the object is a writing instrument (e.g., pen, pencil) or a stylus.

At FIG. 5, system 200 determines that the movement of object 216A satisfies the set of one or more criteria. For example, determining that the movement of object 216A satisfies the set of one or more criteria includes determining that the movement of object 216A is a recognized gesture (e.g., a tap gesture). Upon a determination that the movement of object 216A satisfies the set of one or more criteria, system 200 selects UI element 214A based on the tap gesture.

Figure 6:
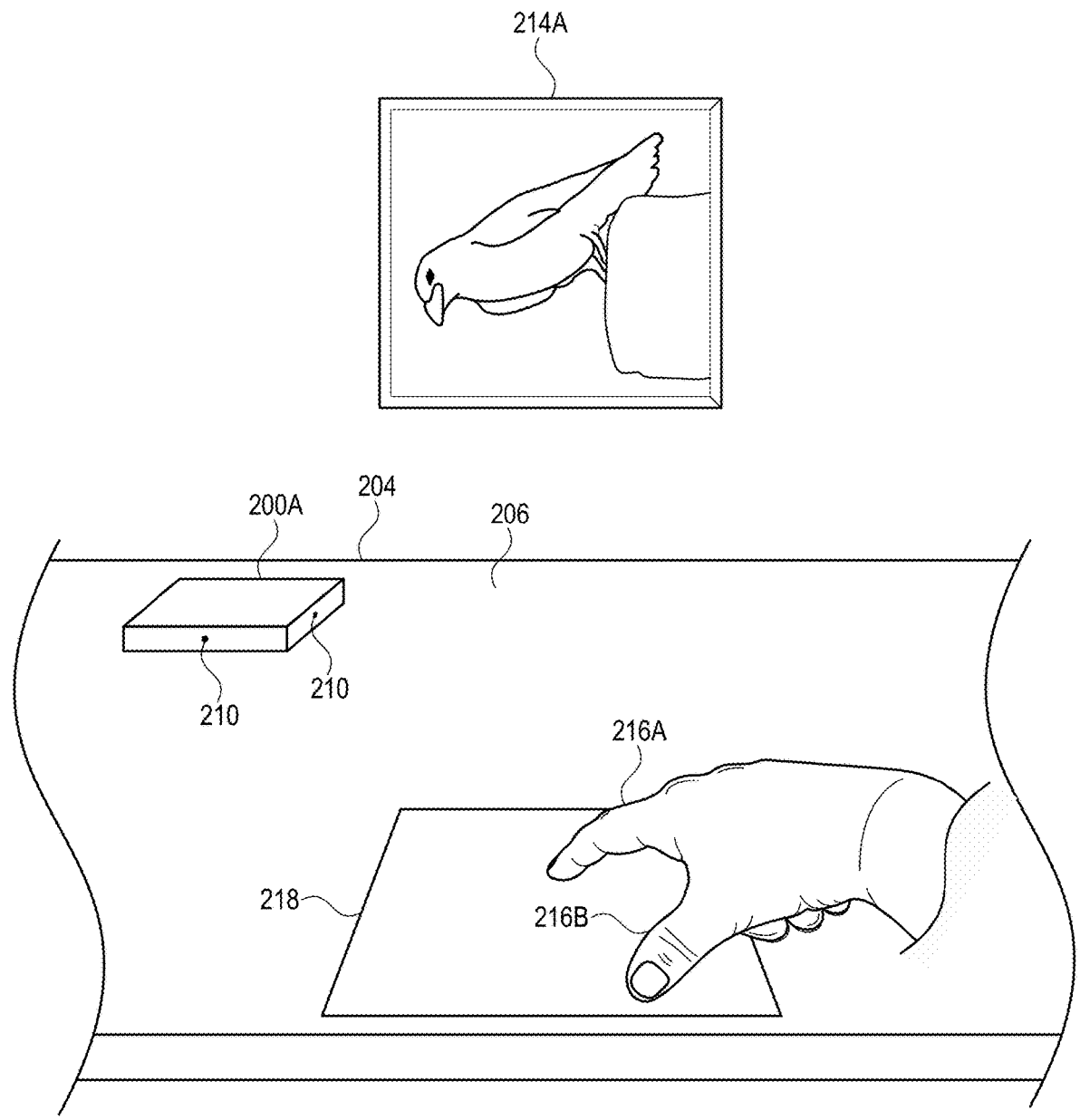
FIGS. 6-10 illustrate additional examples of remote touch detection in a CGR environment.

At FIG. 6, in response to selection of UI element 214A, HMD device 200B displays UI element 214A without the other UI elements. User 202 can correct the orientation of UI element 214A using a rotate gesture. Peripheral device 200A and/or HMD device 200B captures information about object 216A and/or object 216B (e.g., thumb of a user's hand) using the respective camera sensors.

Figure 7:
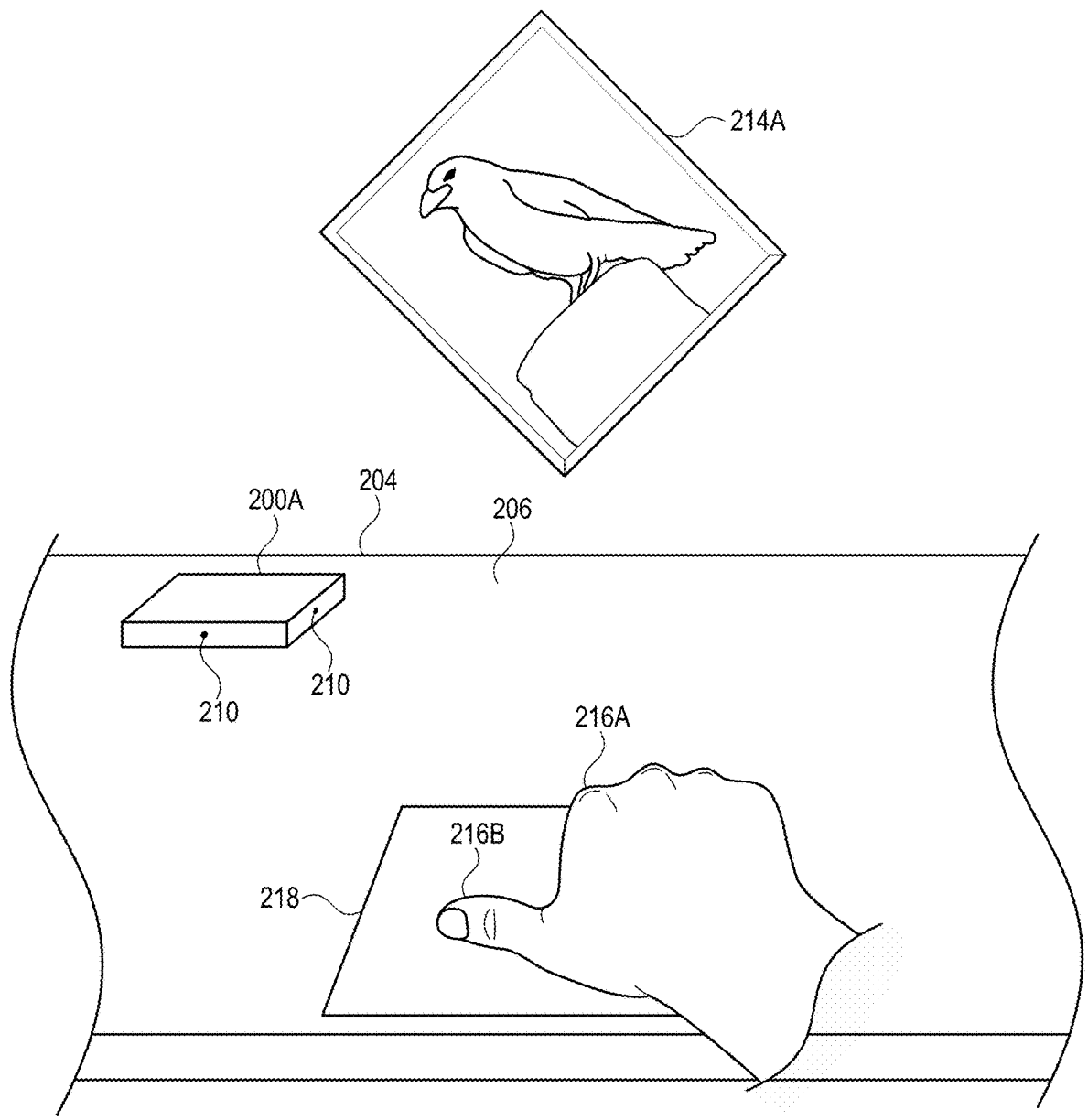

At FIG. 7, as the user performs the rotate gesture, peripheral device 200A and HMD device 200B continue to capture information about object 216A and/or object 216B using their respective camera sensor(s). Due to the position and orientation of object 216A, the information captured by the camera sensors of HMD device 200B is insufficient for determining whether the movement of objects 216A and 216B satisfies the set of one or more criteria. Specifically, the captured information does not include information about object 216A because object 216A is not in the field of view of the camera sensors of HMD device 200B. However, due to the location of peripheral device 200A, the information captured by camera sensor(s) 210 of peripheral device 200A includes information about object 216A. This scenario demonstrates the advantages of having a system with camera sensors that capture information from different perspectives (e.g., angles).

Using the captured information from peripheral device 200A and HMD device 200B, system 200 determines that the movement of object 216A and object 216B satisfies the set of one or more criteria. For example, system 200 determines, based on the captured information, that the movement of objects 216A and 216B results in a touch input and is a recognized gesture (e.g., a rotate gesture). Upon a determination that the movement of object 216A and object 216B satisfies the set of one or more criteria, HMD device 200B displays UI element 214A rotating clockwise from its initial orientation in FIG. 6 to the intermediate orientation shown in FIG. 7.

Figure 8:
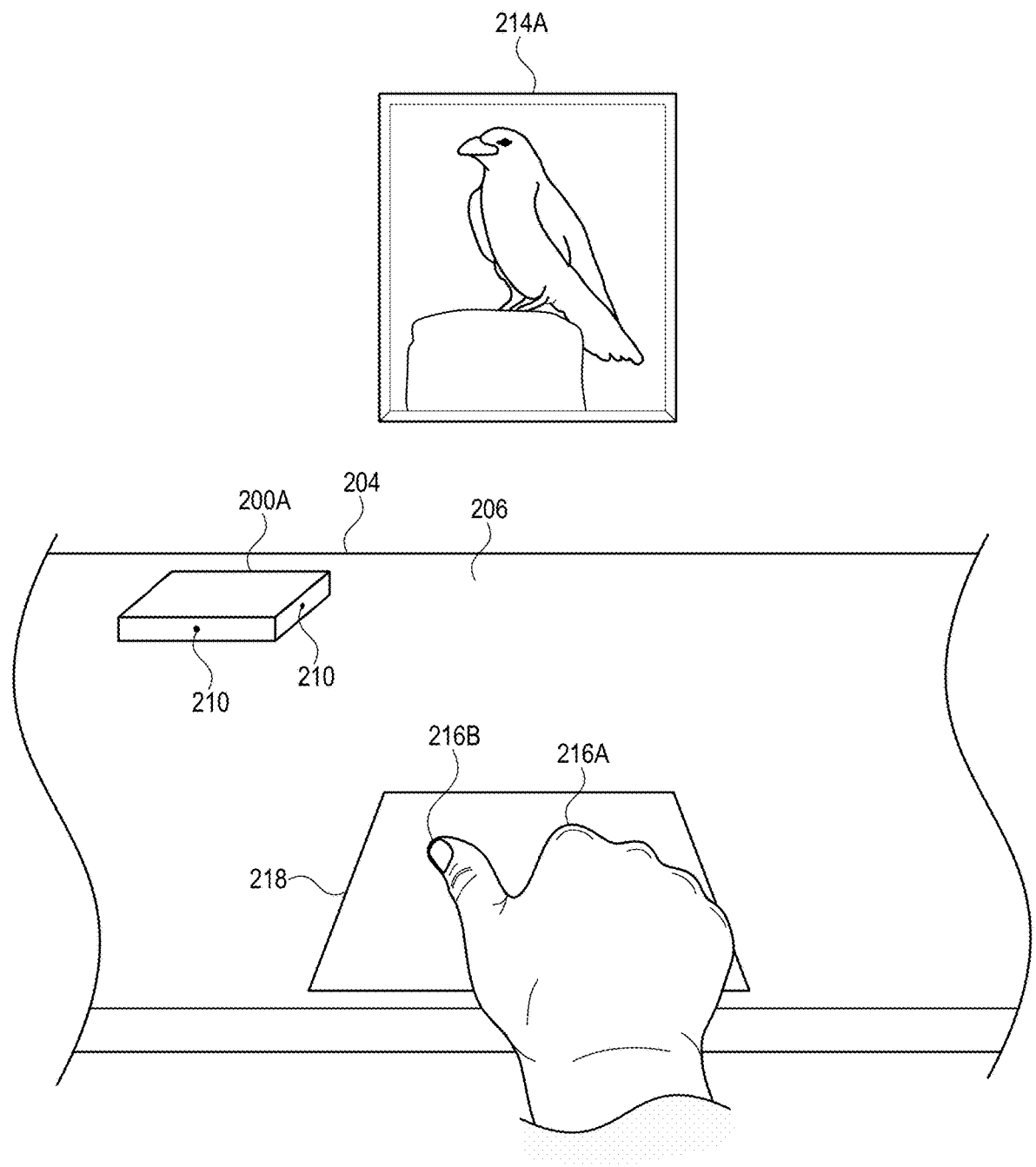

At FIG. 8, as the user continues to perform the rotate gesture, peripheral device 200A and HMD device 200B continue to capture information about object 216A and/or object 216B using their respective camera sensors. Using the captured information, system 200 determines whether the movement of object 216A and 216B continues to satisfy the set of one or more criteria. Upon a determination that the movement of object 216A and 216B continues to satisfy the set of one or more criteria, HMD device 200B displays UI element 214A further rotating clockwise from its intermediate orientation in FIG. 7 to the final orientation shown in FIG. 8.

Figure 9:
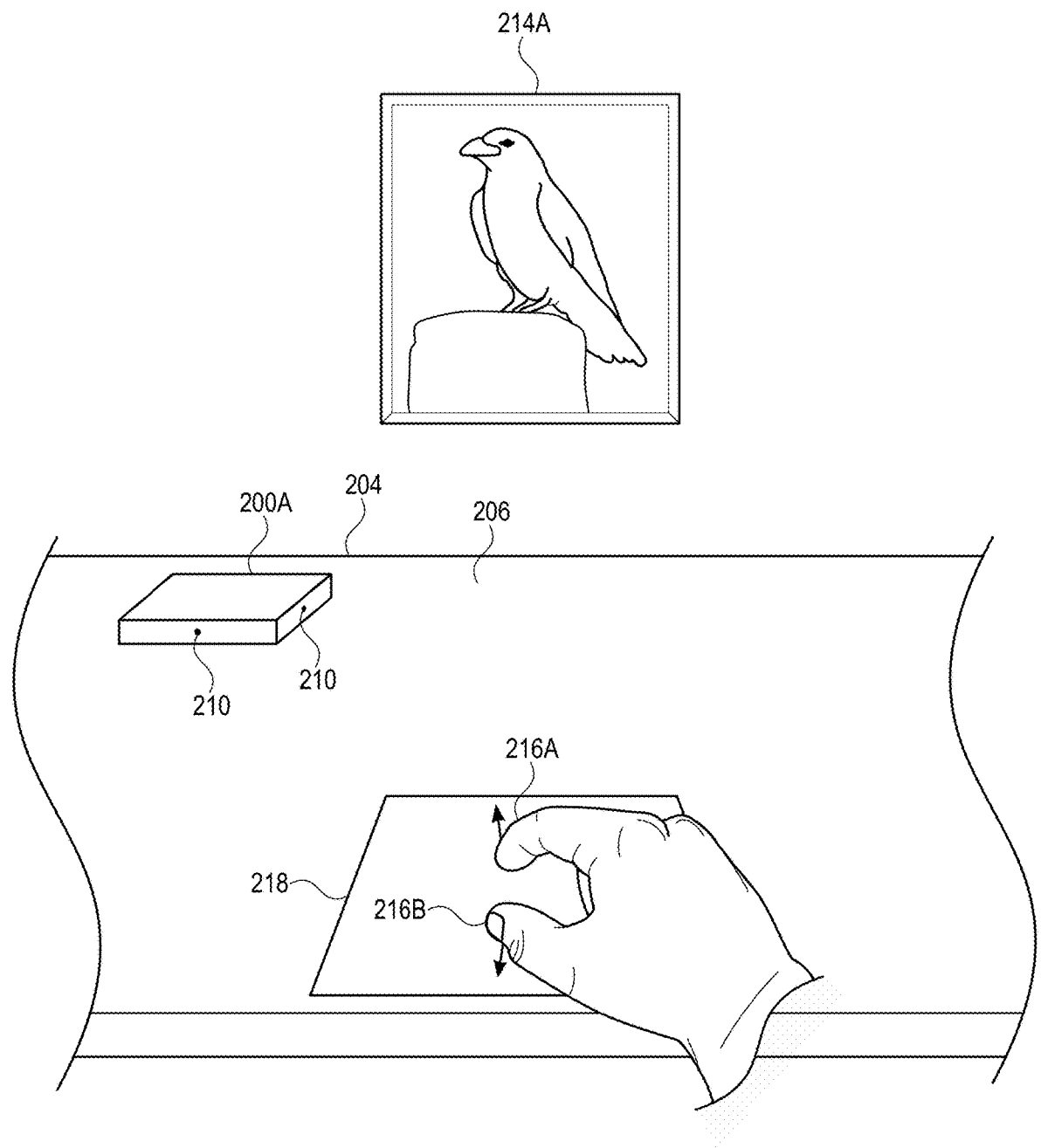

At FIG. 9, once UI element 214A is in the desired orientation, the user wishes to enlarge the size of displayed UI element 214A. To enlarge displayed UI element 214A, the user initiates a spread gesture. As described with respect to the rotate gesture in FIGS. 6-8, peripheral device 200A and HMD device 200B capture information about object 216A and object 216B using the respective camera sensors.

Figure 10:
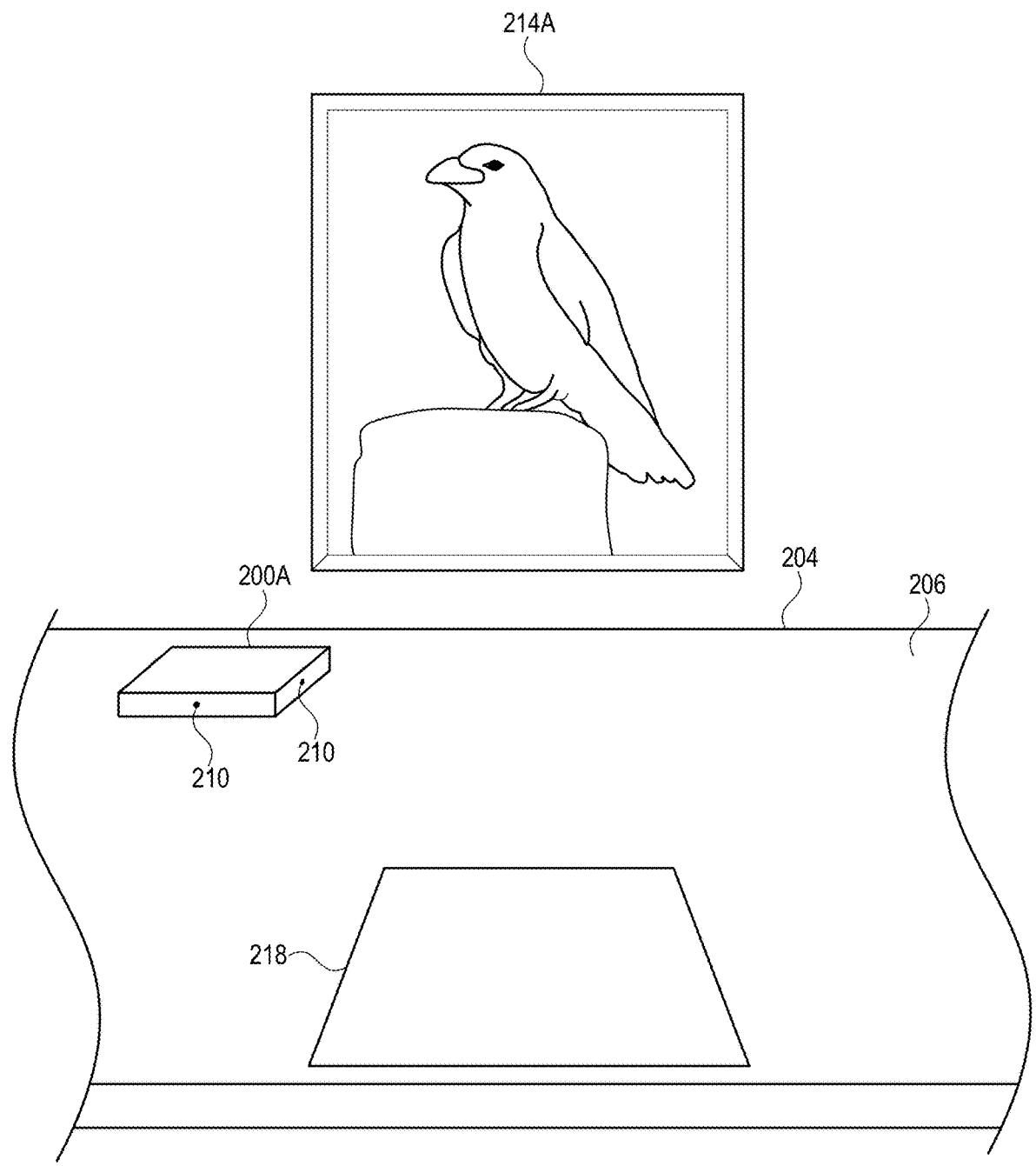

As the user performs the spread gesture, peripheral device 200A and HMD device 200B continue to capture information about object 216A and object 216B using their respective camera sensors. Using the captured information from peripheral device 200A and HMD device 200B, system 200 determines that the movement of object 216A and object 216B satisfies the set of one or more criteria. For example, system 200 determines, based on the captured information, that the movement of object 216A and object 216B results in a touch input and is a recognized gesture (e.g., a spread gesture). Upon a determination that the movement of object 216A and object 216B satisfies the set of one or more criteria, HMD device 200B displays an animation of UI element 214A being enlarged from its initial size in FIG. 9 to the final size shown in FIG. 10.

Figure 11:
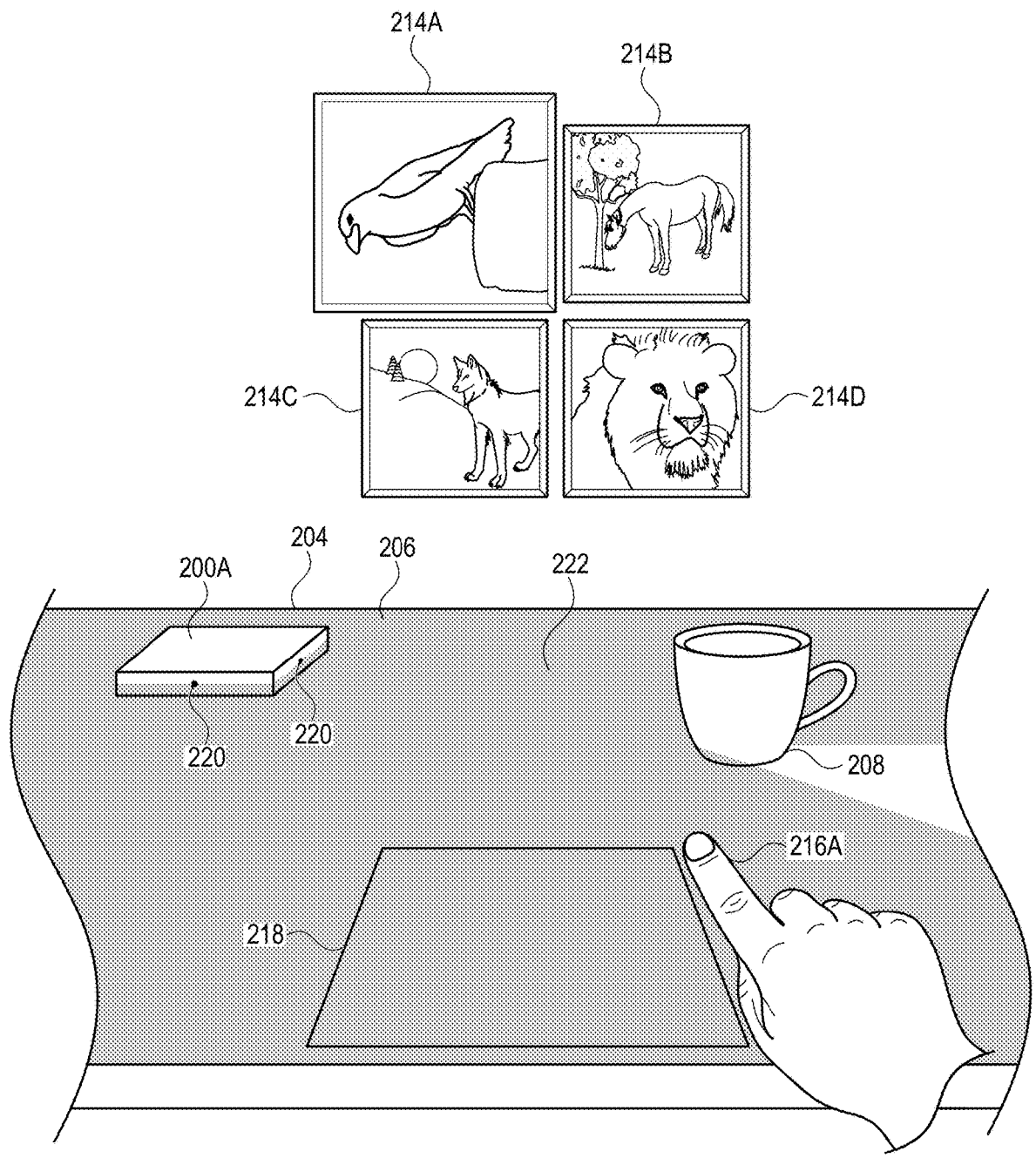
FIGS. 11-12 illustrates an alternative example of a system comprising a head-mounted display device and a peripheral device for enabling remote touch detection.

FIG. 11 illustrates an alternative embodiment of system 200. In FIGS. 4-10, peripheral device 200A includes camera sensor(s) 210 for capturing information about objects in its field of view. In some embodiments, peripheral device 200A does not have camera sensors. In some embodiments, peripheral device 200A includes infrared emitter(s) 220, which emit infrared light to enable remote touch detection. In some embodiments, infrared emitter(s) 220 emit infrared light 222 as a plane of light that is parallel (or substantially parallel) to surface 206. To detect remote touches, HMD device 200B obtains information about an object that coincides (e.g., intersects) with infrared light 222.

For example, similar to the scenario in FIG. 4, suppose user 202 in FIG. 11 wishes to select UI element 214A in order to correct the orientation of the UI element. While UI element 214A is highlighted for selection (e.g., emphasized with respect to the other UI elements), the user selects UI element 214A for editing by performing a tap gesture on surface 206 with object 216A.

Figure 12:
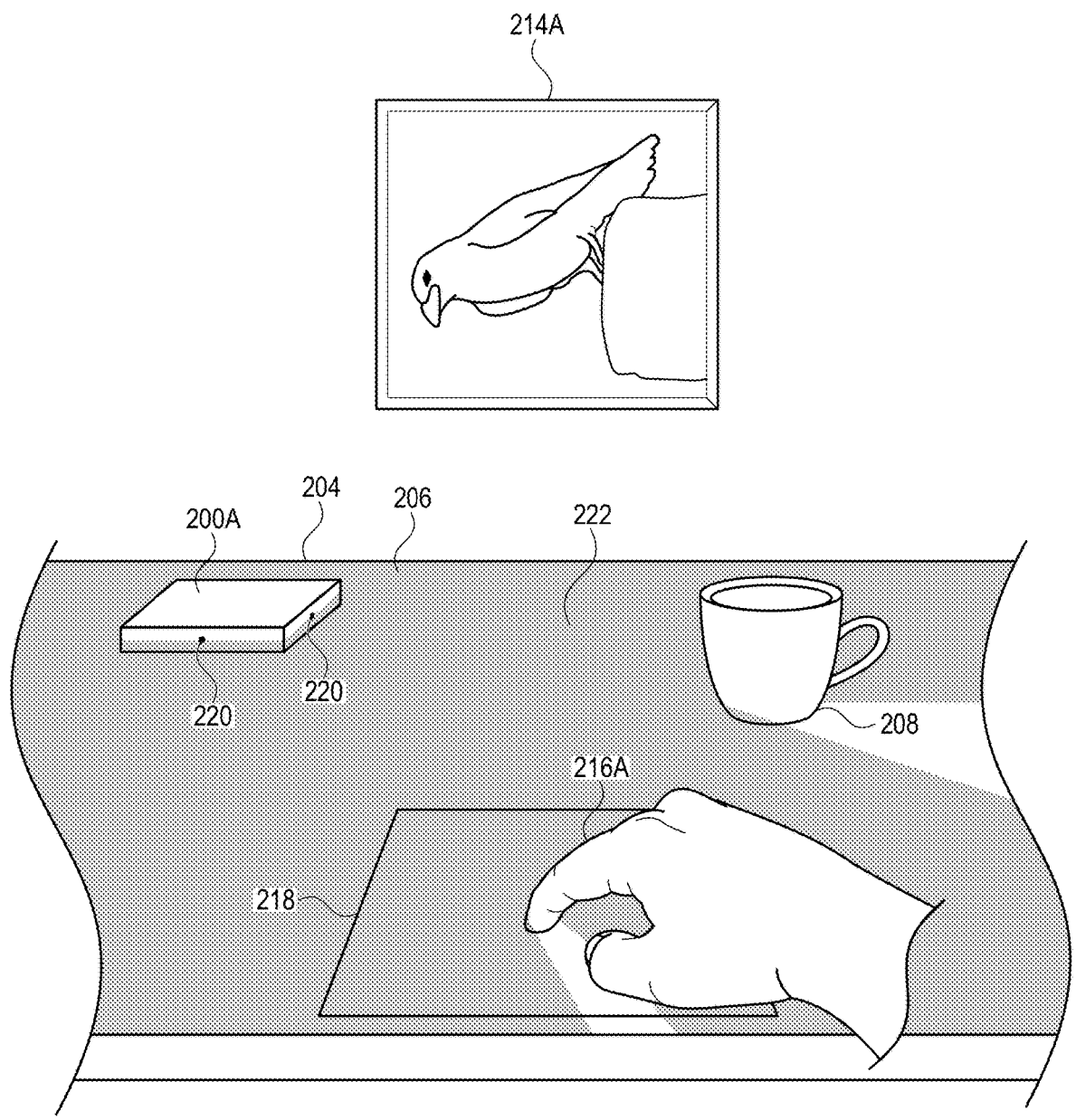

At FIG. 12, as object 216A moves toward the plane of infrared light 222, HMD device 200B captures information about object 216A using its camera sensors. For example, once object 216A coincides with the plane of infrared light 222, HMD device 200B detects the reflection (e.g., identifies occlusion) of the infrared light caused by object 216A coinciding with the plane of infrared light 222. System 200 uses this captured information to determine whether the movement of object 216A satisfies a set of one or more criteria, including, for example, that the movement of the object results in a touch input. Peripheral device 200A, HMD device 200B, or a third device can make this determination.

In some embodiments, the movement of the object results in a touch input when system 200 determines, based on the information obtained by the camera sensors, that the object has touched (e.g., coincided with) the surface. In some embodiments, system 200 determines that the object has touched the surface when the object has coincided with the plane of infrared light 222. At FIG. 12, system 200 determines that the movement of object 216A satisfies the set of one or more criteria. Upon a determination that the movement of object 216A satisfies the set of one or more criteria, system 200 selects UI element 214A based on the tap gesture, as described with respect to FIG. 5.

Figure 13:
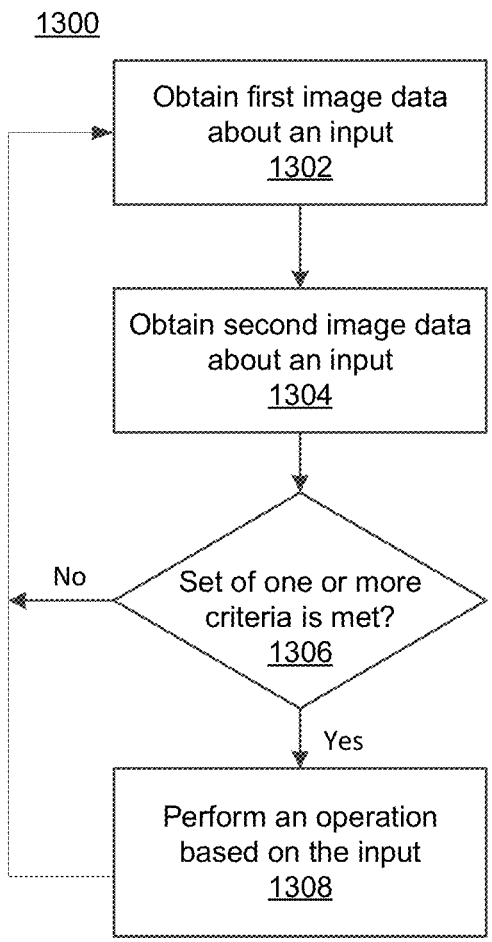
FIG. 13 is a flow diagram illustrating a method for performing remote touch detection.

FIG. 13 is a flow diagram illustrating method 1300 for remote touch detection. In some embodiments, the method is performed by peripheral device 200A. In some embodiments, the method is performed by HMD device 200B. In some embodiments, the method is performed by a third device that is different from peripheral device 200A and HMD device 200B.

At block 1302, a first electronic device obtains first image data (e.g., captured images) about an input (e.g., 216A, 216B) (or movement of an object (e.g., 216A, 216B)), wherein the first image data is obtained using one or more camera sensors (e.g., image sensor(s) 108) of a second electronic device (e.g. peripheral device (e.g., 200A), HMD device (e.g., 200B)). In some embodiments, obtaining first image data includes obtaining image data about a detected physical surface (e.g., 206). In some embodiments, prior to obtaining the first image data and the second image data about the input, the first electronic device determines, based on orientation data from the second electronic device (e.g., motion data), whether a suitable environment exists for receiving touch inputs (e.g., the second electronic device is resting on a flat surface). In some embodiments, the input (or movement of the object) occurs at a location other than the location of the second electronic device and the location of the first electronic device.

In some embodiments, in accordance with a determination that the one or more camera sensors of the second electronic device are occluded, the first electronic device prompts (e.g., via a visual prompt (e.g., 212), auditory prompt, and/or tactile prompt) to move the second electronic device to a new location. In some embodiments, the method further comprises: determining, based on image data (e.g., obtained using the one or more camera sensors of the second electronic device and/or the first electronic device), whether the one or more camera sensors of the second electronic device are occluded. In some embodiments, the image data includes information about objects (e.g., 208) (or the absence of objects) in the field of view of the one or more camera sensors of the second electronic device or information about objects (or the absence of objects) adjacent to or near the second electronic device. In some embodiments, it is determined that the one or more camera sensors of the second electronic device are occluded when an object (e.g., 208) in the field of view is within a threshold distance of the one or more camera sensors. In some embodiments, the method includes prompting to move the second electronic device, or prompting to move the object causing the occlusion, or a combination thereof.

At block 1304, the first electronic device obtains second image data (e.g., captured images) about the input (e.g., 216A, 216B) (or movement of the object (e.g., 216A, 216B)), wherein the second image data is obtained using one or more camera sensors (e.g., image sensor(s) 108) of a first electronic device (e.g., head-mounted device (e.g., 200B), peripheral device (e.g., 200A)), the second electronic device different from the first electronic device. In some embodiments, the first electronic device can be the same as the second electronic device. In some embodiments, obtaining second image data includes obtaining image data about the detected physical surface. In some embodiments, the first device is in communication with the second device. In some embodiments, the first image data and the second image data correspond to the same point in time or period of time. In some embodiments, the input includes movement of a first object (e.g., a first digit of the hand) and a second object (e.g., a second digit of the hand), and at least one of the first image data and the second image data does not include information about both the first object and the second object. In some embodiments, the first image data and the second image data, in combination, provides sufficient data for determining whether the set of one or more criteria is met.

At block 1306, a determination is made as to whether a set of one or more criteria is met based on the first image data and the second image data, wherein the set of one or more criteria includes a criterion that is met when the input is a touch input. In some embodiments, the set of one of one or more criteria includes a criterion that is met when the movement of the object is a valid input. In some embodiments, a valid input is a touch input. In some embodiments, a valid input is a touch input performed by a valid object (e.g., digit, finger, pen, stylus). In some embodiments, the set of one or more criteria is not met when the movement of the object is not a touch input. In some embodiments, the set of one or more criteria is not met when the movement of the object is performed by an invalid object (e.g., an object other than a finger or digit of a user).

In some embodiments, the criteria includes a criterion that is met when the input (or movement of the object) is a gesture (e.g., recognized gesture) (e.g., tap, double-tap, drag, flick, pinch, spread, press, rotate). In some embodiments, the criteria includes a criterion that is met when the input (or movement of the object) is a tap gesture. In some embodiments, the criteria includes a criterion that is met when the input (or movement of the object) is a pinch or spread gesture. In some embodiments, the criteria includes a criterion that is met when the input (or movement of the object) is a rotate gesture. In some embodiments, the criteria includes a criterion that is met when the input (or movement of the object) corresponds to (e.g., was performed by) one or more digits (e.g., finger) of a user. In some embodiments, the set of one or more criteria is not met when the movement of the object is performed by an invalid object (e.g., an object other than a finger or digit of a user). In some embodiments, the determination that a set of one or more criteria is met is made by the first electronic device. In some embodiments, the second electronic device makes the determination.

At block 1308, in accordance with a determination that the set of one or more criteria is met, the first electronic device performs an operation based on (e.g., in response to) the input (or movement of the object) (e.g., an input that makes contact with a detected surface (e.g., 206) (e.g., top of a table or desk)). In some embodiments, in accordance with a determination that the set of one or more criteria is not met based on the first image data and the second image data, the first electronic device forgoes performing the operation based on the input.

In some embodiments, the first electronic device obtains image data about the second electronic device using the one or more camera sensors of the first electronic device. In some embodiments, the first electronic device determines, based on the image data about the second electronic device, a location of the second electronic device. In some embodiments, the location of the second electronic device is determined using techniques such as 3D object detection and/or template matching with the image data. In some embodiments, the first electronic device displays a virtual keyboard (or trackpad (e.g., 218)) based on the location of the second electronic device. In some embodiments, the location of the second electronic device is used as reference point for determining where to display the virtual keyboard (or trackpad). In some embodiments, the virtual keyboard (or trackpad) is displayed in a manner such that the virtual keyboard (or trackpad) appears to rest on the physical surface (e.g., 206), the same physical surface on which the second electronic device rests.)

Figure 14:
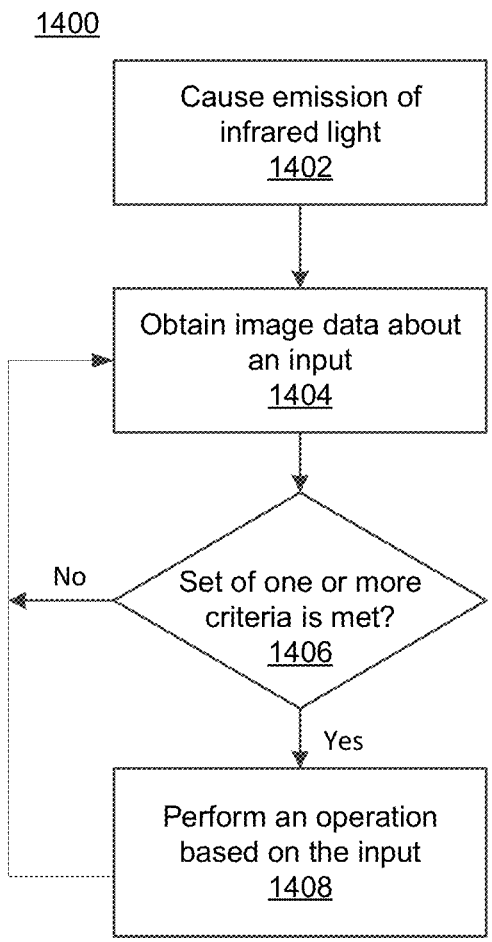
FIG. 14 is a flow diagram illustrating an alternative method for performing remote touch detection.

FIG. 14 is a flow diagram illustrating method 1400 for remote touch detection. In some embodiments, the method is performed by device 200A. In some embodiments, the method is performed by device 200B. In some embodiments, the method is performed by a third device that is different from peripheral device 200A and HMD device 200B.

At block 1402, a first electronic device causes emission of infrared light (e.g., 222) by an infrared source (e.g., 220) (e.g., one or more infrared sources) of a second electronic device (e.g., 200A, 200B). In some embodiments, in accordance with a determination that the infrared source of the second electronic device is occluded, the first electronic device prompts (e.g., via a visual prompt (e.g., 212), auditory prompt, and/or tactile prompt) to move the second electronic device to a new location. In some embodiments, the method further comprises: determining, based on image data (e.g., obtained using the one or more camera sensors of the first electronic device), whether the infrared source of the second electronic device is occluded. In some embodiments, the image data includes information about objects (or the absence of objects) near or adjacent to the second electronic device. In some embodiments, it is determined that the infrared source of the second electronic device is occluded when an object is within a threshold distance of the second electronic device or the infrared source. In some embodiments, the method includes prompting to move the second electronic device, or prompting to move the object causing the occlusion, or a combination thereof.

At block 1404, the first electronic device obtains image data about an input (e.g., 216A, 216B) (or movement of an object (e.g., 216A, 216B), wherein the image data is obtained using one or more camera sensors of a first electronic device (e.g., 200A, 200B), the second electronic device different from the first electronic device. In some embodiments, the input (or movement of the object) occurs at a location other than the location of the second electronic device and the location of the first electronic device.

At block 1406, a determination is made as to whether a set of one or more criteria is met based on the image data, wherein the set of one or more criteria includes a criterion that is met when the input (e.g., 216A, 216B) makes contact with the infrared light (e.g., 222). In some embodiments, the set of one of one or more criteria includes a criterion that is met when the movement of the object is a valid input. In some embodiments, a valid input is a touch input. In some embodiments, a valid input is a touch input performed by a valid object (e.g., digit, finger, pen, stylus). In some embodiments, the set of one or more criteria is not met when the movement of the object is not a touch input. In some embodiments, the set of one or more criteria is not met when the movement of the object is performed by an invalid object (e.g., an object other than a finger or digit of a user).

In some embodiments, the criteria includes a criterion that is met when the input (or movement of the object) is a gesture (e.g., recognized gesture) (e.g., tap, double-tap, drag, flick, pinch, spread, press, rotate). In some embodiments, the criteria includes a criterion that is met when the input (or movement of the object) is a tap gesture. In some embodiments, the criteria includes a criterion that is met when the input (or movement of the object) is a pinch or spread gesture. In some embodiments, the criteria includes a criterion that is met when the input (or movement of the object) is a rotate gesture. In some embodiments, the criteria includes a criterion that is met when the input (or movement of the object) corresponds to (e.g., was performed by) one or more digits (e.g., finger) of a user. In some embodiments, the set of one or more criteria is not met when the movement of the object is performed by an invalid object (e.g., an object other than a finger or digit of a user). In some embodiments, the determination that a set of one or more criteria is met is made by the first electronic device. In some embodiments, the second electronic device makes the determination.

At block 1408, in accordance with a determination that the set of one or more criteria is met, the first electronic device performs an operation based on (e.g., in response to) the input (or movements of the object) (e.g., an input that makes contact with a detected surface (e.g., 206) (e.g., top of a table, desk)). In some embodiments, in accordance with a determination that the set of one or more criteria is not met based on the image data, the first electronic device forgoes performing the operation based on the input.

In some embodiments, the first electronic device obtains image data about the second electronic device (e.g., 200A) using the one or more camera sensors of the first electronic device (e.g., 200B). In some embodiments, the first electronic device determines, based on the image data about the second electronic device, a location of the second electronic device. In some embodiments, the location of the second electronic device is determined using techniques such as 3D object detection and/or template matching with the image data. In some embodiments, the first electronic device displays a virtual keyboard (or trackpad (e.g., 218)) based on the location of the second electronic device. In some embodiments, the location of the second electronic device is used as reference point for determining where to display the virtual keyboard (or trackpad). In some embodiments, the virtual keyboard (or trackpad) is displayed in a manner such that the virtual keyboard (or trackpad) appears to rest on the physical surface (e.g., 206), the same physical surface on which the second electronic device rests.

The details of the processes described above with respect to method 1400 are also applicable in an analogous manner to the methods described with respect to method 1300. As an example, method 1300 optionally includes one or more of the characteristics of the method described above with reference to method 1400. For example, method 1300 can also include emitting infrared light to enable accurate remote touch detection. For brevity, these details are not repeated below.

Advantageously, methods 1300 and 1400 improve the accuracy and robustness of remote touch detection. For example, methods 1300 and 1400 enable accurate detection of remote touches, including the ability to ignore spurious inputs (e.g., non-hand input, palm input). This can result in an efficient and intuitive technique for interacting with a CGR environment.

What is claimed is:

1. A first electronic device, comprising:
one or more processors; and
memory storing one or more programs configured to be executed by the one or more processors, the one or more programs including instructions for:
obtaining first image data about an input, wherein the first image data is obtained using one or more camera sensors of the first electronic device external to a second electronic device;
obtaining second image data about the input, wherein the second image data is obtained using one or more camera sensors of the second electronic device, the first electronic device different from the second electronic device; and
in accordance with a determination that a set of one or more criteria is met based on the first image data and the second image data, performing an operation based on the input, wherein the set of one or more criteria includes a criterion that is met when the input is a touch input.

2. The first electronic device of claim 1, the one or more programs further including instructions for:
in accordance with a determination that the set of one or more criteria is not met based on the first image data and the second image data, forgoing performing the operation based on the input.

3. The first electronic device of claim 1, the one or more programs further including instructions for:
prior to obtaining the first image data and the second image data about the input, determining, based on orientation data from at least one of the first electronic device or the second electronic device, whether a suitable environment exists for receiving touch inputs.

4. The first electronic device of claim 1, wherein the input occurs at a location other than the location of the first electronic device and the location of the second electronic device.

5. The first electronic device of claim 1, wherein the criteria includes a criterion that is met when the input is a tap gesture, a pinch or spread gesture, a rotate gesture, or corresponds to one or more digits of a user.

6. The first electronic device of claim 1, wherein the determination that a set of one or more criteria is met is made by the first electronic device.

7. The first electronic device of claim 1, wherein the first image data and the second image data correspond to a same point in time or period of time.

8. The first electronic device of claim 1, the one or more programs further including instructions for:
in accordance with a determination that the one or more camera sensors of the second electronic device are occluded, prompting to move the second electronic device to a first new location; and
in accordance with a determination that the one or more camera sensors of the first electronic device are occluded, prompting to move the first electronic device to a second new location.

9. The first electronic device of claim 1, the one or more programs further including instructions for:
obtaining image data about the second electronic device using the one or more camera sensors of the first electronic device;
determining, based on the image data about the second electronic device, a location of the second electronic device; and
displaying a virtual keyboard based on the location of the second electronic device.

10. The first electronic device of claim 1, wherein:
the input includes movement of a first object and a second object,
at least one of the first image data and the second image data does not include information about both the first object and the second object, and
the first image data and the second image data, in combination, provides sufficient data for determining whether the set of one or more criteria is met.

11. The first electronic device of claim 1, the one or more programs further including instructions for:
obtaining image data about the first electronic device using the one or more camera sensors of the second electronic device;
determining, based on the image data about the first electronic device, a location of the first electronic device; and
displaying a virtual keyboard based on the location of the first electronic device.

12. A non-transitory computer-readable storage medium storing one or more programs configured to be executed by one or more processors of a first electronic device, the one or more programs including instructions for:
obtaining first image data about an input, wherein the first image data is obtained using one or more camera sensors of the first electronic device external to a second electronic device;
obtaining second image data about the input, wherein the second image data is obtained using one or more camera sensors of the second electronic device, the first electronic device different from the second electronic device; and
in accordance with a determination that a set of one or more criteria is met based on the first image data and the second image data, performing an operation based on the input, wherein the set of one or more criteria includes a criterion that is met when the input is a touch input.

13. The computer-readable storage medium of claim 12, the one or more programs further including instructions for:
in accordance with a determination that the set of one or more criteria is not met based on the first image data and the second image data, forgoing performing the operation based on the input.

14. The computer-readable storage medium of claim 12, the one or more programs further including instructions for:
prior to obtaining the first image data and the second image data about the input, determining, based on orientation data from at least one of the first electronic device or the second electronic device, whether a suitable environment exists for receiving touch inputs.

15. The computer-readable storage medium of claim 12, wherein the input occurs at a location other than the location of the first electronic device and the location of the second electronic device.

16. The computer-readable storage medium of claim 12, wherein the first image data and the second image data correspond to a same point in time or period of time.

17. The computer-readable storage medium of claim 12, the one or more programs further including instructions for:
in accordance with a determination that the one or more camera sensors of the second electronic device are occluded, prompting to move the second electronic device to a first new location; and
in accordance with a determination that the one or more camera sensors of the first electronic device are occluded, prompting to move the first electronic device to a second new location.

18. The computer-readable storage medium of claim 12, wherein:
the input includes movement of a first object and a second object, and
at least one of the first image data and the second image data does not include information about both the first object and the second object.

19. A method, comprising:
at a first electronic device:
obtaining first image data about an input, wherein the first image data is obtained using one or more camera sensors of the first electronic device external to a second electronic device;
obtaining second image data about the input, wherein the second image data is obtained using one or more camera sensors of the second electronic device, the first electronic device different from the second electronic device; and
in accordance with a determination that a set of one or more criteria is met based on the first image data and the second image data, performing an operation based on the input, wherein the set of one or more criteria includes a criterion that is met when the input is a touch input.

20. The method of claim 19, further comprising:
in accordance with a determination that the set of one or more criteria is not met based on the first image data and the second image data, forgoing performing the operation based on the input.

21. The method of claim 19, further comprising:
prior to obtaining the first image data and the second image data about the input, determining, based on orientation data from at least one of the first electronic device or the second electronic device, whether a suitable environment exists for receiving touch inputs.

22. The method of claim 19, wherein the input occurs at a location other than the location of the first electronic device and the location of the second electronic device.

23. The method of claim 19, wherein the first image data and the second image data correspond to a same point in time or period of time.

24. The method of claim 19, further comprising:
in accordance with a determination that the one or more camera sensors of the second electronic device are occluded, prompting to move the second electronic device to a first new location; and
in accordance with a determination that the one or more camera sensors of the first electronic device are occluded, prompting to move the first electronic device to a second new location.

25. The method of claim 19, wherein:
the input includes movement of a first object and a second object, and
at least one of the first image data and the second image data does not include information about both the first object and the second object.

* * * * *